(12) United States Patent
Buonaiuto, Jr. et al.

(10) Patent No.: US 9,192,111 B2
(45) Date of Patent: Nov. 24, 2015

(54) POT FOR A HYDROPONIC DEVICE

(71) Applicants: Michael Buonaiuto, Jr., Boca Raton, FL (US); Michael Buonaiuto, Sr., Boca Raton, FL (US)

(72) Inventors: Michael Buonaiuto, Jr., Boca Raton, FL (US); Michael Buonaiuto, Sr., Boca Raton, FL (US)

(*) Notice: Subject to any disclaimer, the term of this patent is extended or adjusted under 35 U.S.C. 154(b) by 42 days.

(21) Appl. No.: 14/139,988

(22) Filed: Dec. 24, 2013

(65) Prior Publication Data

US 2015/0173314 A1    Jun. 25, 2015

(51) Int. Cl.
*A01G 31/00* (2006.01)
*A01G 31/02* (2006.01)

(52) U.S. Cl.
CPC ..................................... *A01G 31/02* (2013.01)

(58) Field of Classification Search
CPC . A01G 31/00; A01G 2031/002; A01G 31/02; A01G 31/06; A01G 2031/006; A01G 27/06; A01G 9/02; A01G 9/022
USPC ..................................................... 47/62 R, 63
See application file for complete search history.

(56) References Cited

U.S. PATENT DOCUMENTS

| | | | |
|---|---|---|---|
| 5,269,094 A | 12/1993 | Wolverton et al. | |
| 6,247,268 B1 * | 6/2001 | Auer | 47/62 R |
| 8,291,641 B2 | 10/2012 | Triantos | |
| 8,484,890 B2 * | 7/2013 | Simmons | 47/62 A |
| 2009/0151248 A1 * | 6/2009 | Bissonnette et al. | 47/59 S |
| 2011/0067301 A1 | 3/2011 | DeMitchell et al. | |
| 2012/0279126 A1 * | 11/2012 | Simmons | 47/62 A |

* cited by examiner

*Primary Examiner* — Kristen C Hayes
(74) *Attorney, Agent, or Firm* — Locke Lord LLP; Howard M. Gitten

(57) ABSTRACT

A hydroponic pot for supporting vegetation therein has a neck forming an opening. A cage extends from the neck. A lip extends from the neck, and curved along the neck.

11 Claims, 5 Drawing Sheets

POT FOR A HYDROPONIC DEVICE

BACKGROUND OF THE INVENTION

This invention is directed to a basket for holding vegetation in a hydroponic system, and more particularly, a basket having structure for better anchoring and positioning of the vegetation within the basket within the hydroponic system.

Hydroponic systems are known in the art, by way of example, from U.S. Pat. No. 6,247,268. Generally, hydroponic systems include tubing that are sealingly attached together to define a container which conveys liquids therethrough. At least a portion of the container includes a plurality of openings. Water carrying nutrients is pumped through the container. A plurality of baskets are disposed within each opening to extend into or just above the water traveling within the tubing.

The prior art system has been satisfactory, however it suffers from the disadvantage, that the baskets have a cylindrical sidewall with holes therein to allow access to vegetation within the basket by the nutrients. The baskets have a floor which may also have openings therein. The top has an opening for receiving vegetation therein and a lip is formed around the opening. The lip is sized to be bigger than the opening so that when a basket is inserted within the opening of the container, the lip rests upon the container. However, the lip extends at a right angle from the basket, and because the tubing is curved, only a portion of the lip contacts the tubing and the lip does not fully rest on the tubing. Therefore, the basket is not sufficiently anchored within the tubing, and as a result, the basket becomes jostled as it comes in contact with the fluid traveling through the system; and become dislodged as the plant grows, or can even be blown by the wind. This can result in less than required contact between the vegetation and the nutrients, and even the moving of the basket out of the opening. This limits plant height and longevity.

In the prior art, in order to overcome this deficiency, sophisticated construction has been developed. By way of example, basket brackets may be installed within the tubing to position and stabilize the basket. However, this requires extra pieces, alignment of those pieces, and access to those pieces for attachment and maintenance.

Accordingly, a basket which overcomes the shortcomings of the prior art is desired.

BRIEF SUMMARY OF THE INVENTION

A hydroponic pot includes a basket having a cylindrical sidewall and a floor. An opening is formed at an end of the basket and a lip circumscribes the opening extending away from the opening. The lip has a substantially arced shape.

In one embodiment of the invention, the sidewall is tapered. At least a portion of the sidewall may be formed as a cage, having openings between bar like structure. A portion of the sidewall may be formed as a solid material and a score line may extend around the solid material portion of the sidewall. The bottom may be tapered to form an overall bullet shape to the basket.

BRIEF DESCRIPTION OF THE DRAWINGS

The present disclosure would be better understood by reading the written description with reference to the accompanying drawing figures, in which the reference numerals denote the similar structure and refer to the elements throughout in which.

DETAILED DESCRIPTION OF THE PREFERRED EMBODIMENTS

Figure 1:
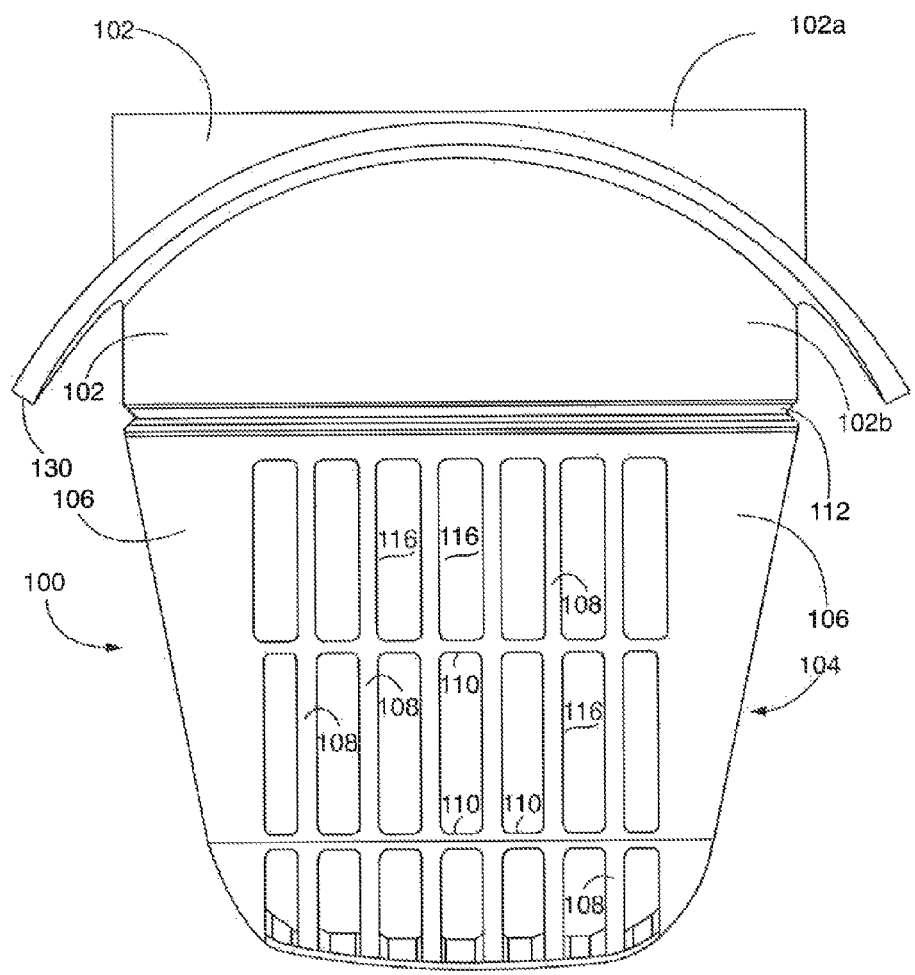
FIG. 1 is a front elevation view of a hydroponic pot constructed in accordance with the invention.
Figure 2:
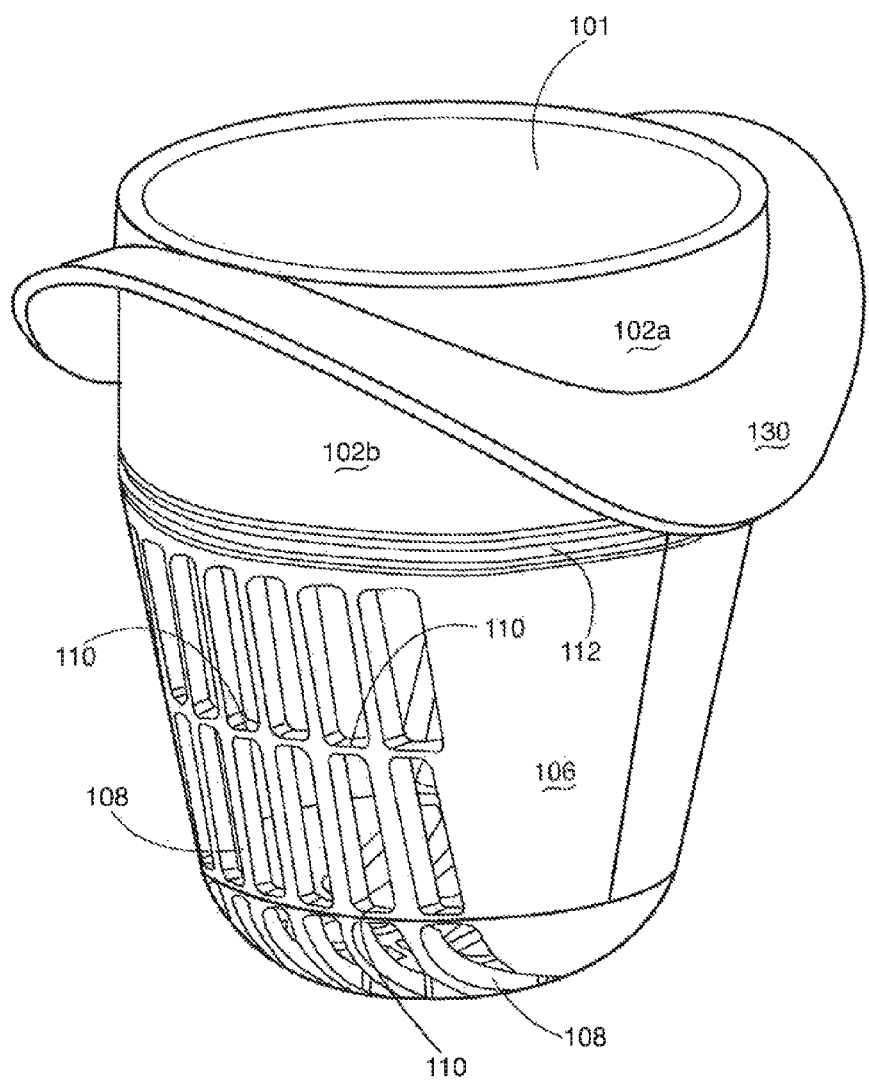
FIG. 2 is a perspective view of the hydroponic pot constructed in accordance with the invention.
Figure 3:
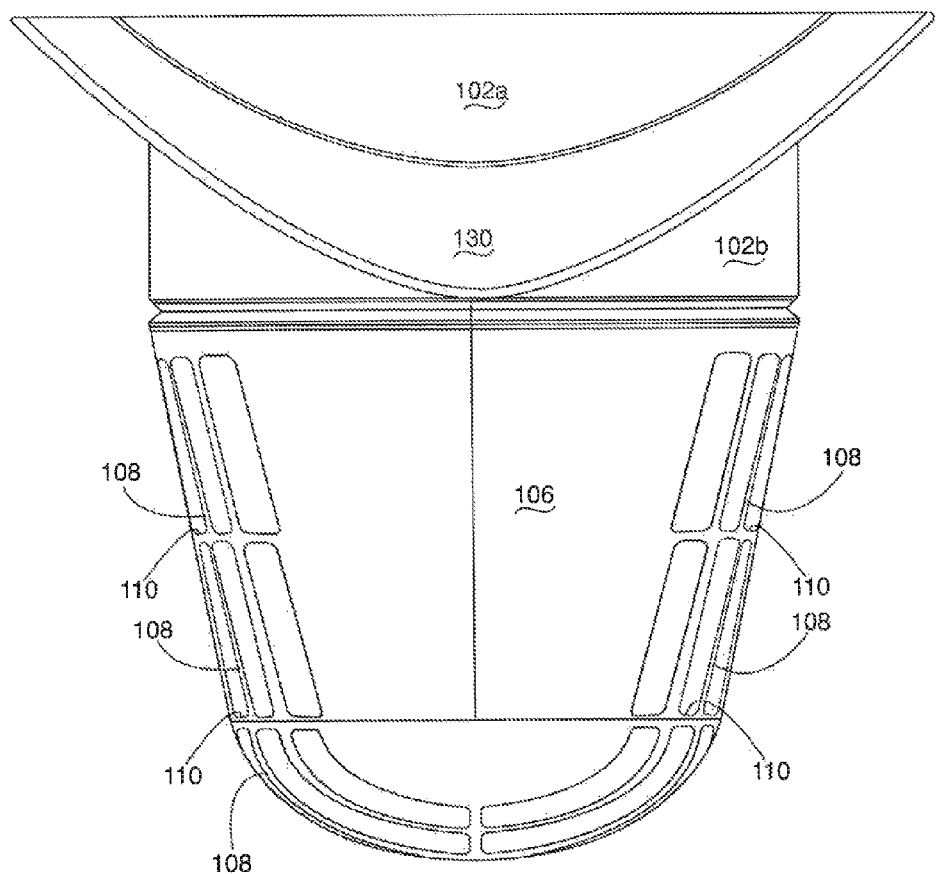
FIG. 3 is a side elevation view of the hydroponic pot constructed in accordance with the invention.
Figure 4:
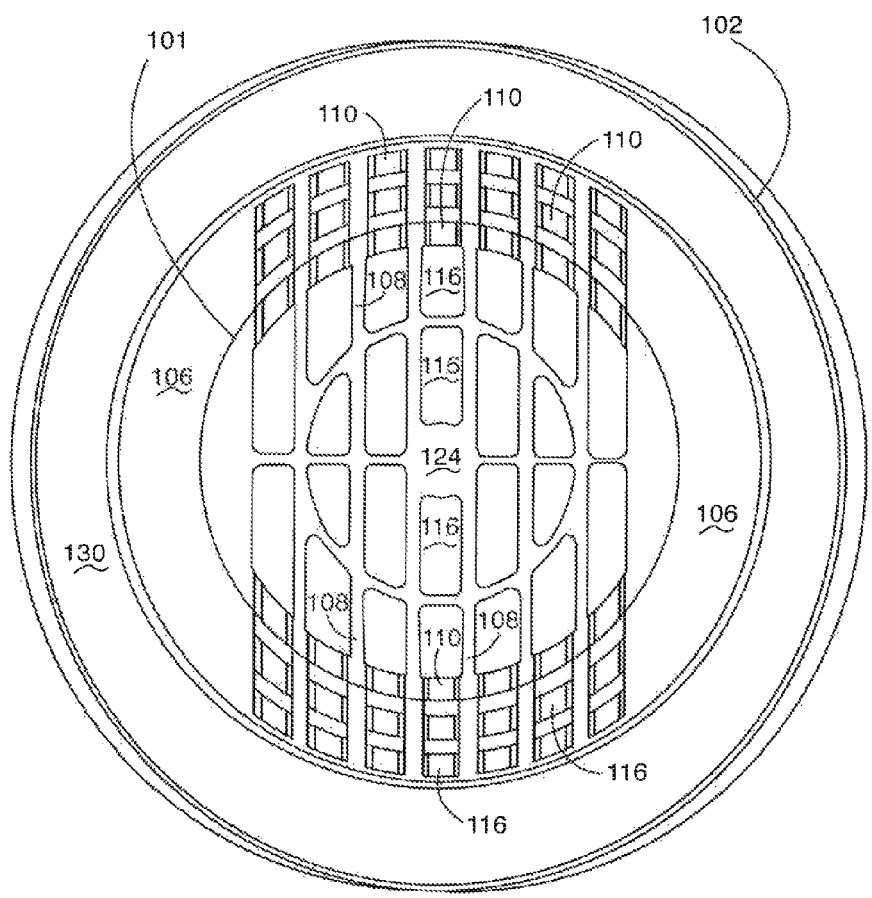
FIG. 4 is a top plan view of the hydroponic pot constructed in accordance with the invention.

Reference is now made to FIGS. 1-4 in which a pot generally indicated as 100 includes a neck 102 and a basket 104 depending from neck 102. In one non-limiting preferred embodiment, basket 104 includes at least one solid portion 106 and at least two faces with openings. In a preferred non-limiting embodiment, open faces are formed as a cage having spaced bars 108 and reinforcing bars 110 connecting adjacent spaced bars 108 to form openings 116 throughout portions of basket 104. This is in contrast to neck 102 which in a preferred non-limiting embodiment is formed of a solid materials.

It is well understood that basket 104 may be made entirely of an open surface; i.e., without solid portion 106. Also, while a cage structure is preferred, any structure which provides more open surfaces than solid surfaces, such as perforations or the like, may also be used.

In a preferred non-limiting embodiment, basket 104 is separated from neck 102 by a thinned portion within neck 102 such as a score line 112 extending about the circumference of pot 100 by way of non-limiting example. This section is a thinned wall; thinner than either of neck 102 or basket 104. Furthermore, basket 104 is tapered, having a substantially bullet shaped section extending towards a floor 124 in a curve from neck 104 to floor 124. A reinforcing ring 120 disposed in floor 124 forms additional openings 116 at the bottom of basket 104.

A curved lip 130 extends about opening 101 formed by neck 102 at an end of pot 100 opposite floor 124. Lip 130 divides neck 102 into an upper portion 102a and a lower portion 102b and has a curve along neck 102.

Figure 5:
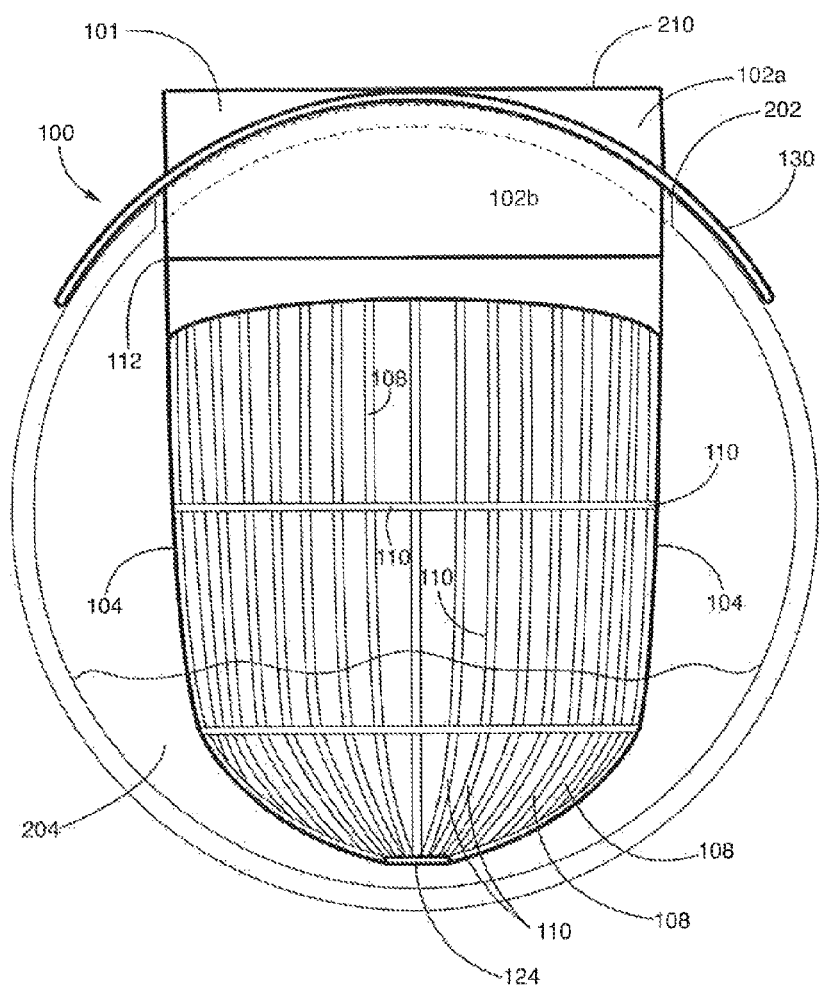
FIG. 5 is a side elevation view of a pot situated within the hydroponic system in accordance with an embodiment of the invention.

As known in the art, pots 100 are disposed in tubes; the tubes provide access to flowing nutrients for vegetation held within pot 100. Accordingly, in a preferred, non-limiting embodiment, as seen in FIG. 5, pot 100 extends through an opening 202 of a tube 200 as known in the art. The curvature of lip 130 substantially matches the curvature of tube 200 stabilizing pot 100 within tube 200. Furthermore, lip 130 is dimensioned to cover opening 202 reducing evaporation of the nutrients and liquids contained in a flow 204 flowing through tube 200 and keeping rain water from entering opening 202. Neck 102 working with lip 130 keeps pot 104 stable and in position within opening 202.

Basket 104 is tapered having an overall bullet shape towards bottom 124. By tapering basket 104, the roots of vegetation contained within pot 100 can spread out extending through openings 116 to receive the liquid nutrient from flow 204. Solid portions 106 keep the root mass form expanding towards the inner walls of tube 200 and directed downward, thus keeping root growth away from the tube walls allowing better flow of the nutrients into the roots. By providing a more tapered bottom, i.e., bullet shape for basket 104 of pot 100, pot 104 is capable of reaching more levels of water nutrients as it extends further than the prior art square bottomed pot.

As will be well understood, during use pot 100 is inserted through opening 202 of hydroponic tube 200. Lip 130 covers opening 202 and extends sufficiently to rest upon at least a portion of tube 200 adjacent opening 202, stabilizing the pot within opening 202 while limiting evaporation of nutrients from flow 204 and preventing rain water from entering and flooding pipe 200.

Basket 104 extends into flow 204 and the cage portions of basket 104, with openings 116, are disposed on opposed sides of basket 104 to allow flow of liquid in flow 204 through basket 104 providing nutrients to vegetation located therein.

Furthermore, the above described pot 104 can be used to anchor other conventional pots. Pot 104 is cut at score line 112. A conventional pot of any length acceptable to tube 200, and having an outer basket diameter less than the inner diameter of basket 104 is nested within neck 102. By providing an upper neck 102a having a flat top, the smaller pot, having a non-arced lip, as known as the art may be slid in inside of the inventive pot and rest flat on top 210 of pot 100 while the entire structure is anchored by lip 130 and neck 102. Furthermore, a cutaway pot can also better support a mature plant that has grown roots in a standard net pot to be inserted into neck 102.

By providing a curved lip, the pot is better anchored with the tubing, providing more consistent access to the water flow, and by maintaining a correct orientation to the tubing promotes root growth in a direction "down" towards the water flow and away from the tubing walls.

While the invention has been particularly shown and described to reference the preferred embodiments thereof, it is understood by those skilled in the art that various changes in form and detail may be made therein without departing from the spirit and scope of the invention encompassed by the appended claims.

What is claimed is new and desired to be protected by Letters Patent of the United States is:

1. A hydroponic pot for supporting vegetation therein comprising:
    a neck having an opening therein;
    a basket extending from the neck;
    a lip extending from the neck about the opening, the lip having a curve therein along the neck;
    wherein a first portion of the neck extends above the lip and a second portion of the neck extends below the lip.

2. A hydroponic pot for supporting vegetation therein comprising:
    a neck having an opening therein;
    a basket extending from the neck;
    a lip extending from the neck about the opening, the lip having a curve therein along the neck; and
    a score line extending about the circumference of the neck.

3. A hydroponic pot for supporting vegetation therein comprising:
    a neck having an opening therein;
    a basket extending from the neck;
    a lip extending from the neck about the opening, the lip having a curve therein along the neck; and
    further comprising a score line extending about the circumference of the neck.

4. The hydroponic pot of claim 3, wherein the lip extends from the neck sufficiently to cover an opening in which the hydroponic pot is disposed.

5. The hydroponic pot of claim 3, wherein the curve of the lip substantially matches the curve of a tube in which the hydroponic pot is disposed.

6. The hydroponic pot of claim 3, wherein the basket is tapered in a direction away from the neck.

7. The hydroponic pot of claim 3, wherein the basket includes at least one solid portion and at least a first face and a second face on opposed sides of the at least one solid portion, the first face and at least second face having openings therein.

8. A hydroponic pot for supporting vegetation therein comprising:
    a neck having an opening therein;
    a basket extending from the neck;
    a lip extending from the neck about the opening, the lip having a curve therein along the neck;
    further comprising a score line thin portion extending about the circumference of the neck; and
    wherein the basket is tapered in a direction away from the neck.

9. The hydroponic pot of claim 8, wherein the lip extends from the neck sufficiently to cover an opening in which the hydroponic pot is disposed.

10. The hydroponic pot of claim 8, wherein the curve of the lip substantially matches the curve of a tube in which the hydroponic pot is disposed.

11. The hydroponic pot of claim 8, wherein the basket includes at least one solid portion and at least a first face and a second face on opposed sides of the at least one solid portion, the first face and at least second face having openings therein.

* * * * *